United States Patent Office 2,947,788
Patented Aug. 2, 1960

2,947,788
MANUFACTURE OF AROMATIC THIOPHENOLS

Harold Pitt, Lafayette, Calif., assignor to Stauffer Chemical Company, a corporation of Delaware No Drawing. Filed Apr. 22, 1959, Ser. No. 808,007

9 Claims. (Cl. 260—608)

This invention relates to a process for the production of thiophenols and disulfides and, more particularly, relates to a process for producing aromatic thiophenols and disulfides by the reduction of the corresponding aromatic sulfonic acids with elemental phosphorus, using iodine as the catalyst.

Thiophenols find many uses in the art, but heretofore have been rather difficult to manufacture. According to the present invention, aromatic thiophenols and/or disulfides are made in high yield from easily available starting materials by heating an anhydrous molten sulfonic acid in the presence of elemental phosphorus with iodine as a catalyst. The reaction can be conducted at any temperature from about 80° C. to 225° C. The quantity of phosphorus which is used will depend on whether one desires the disulfide or the thiophenol as the final product. When the disulfide is desired, the phosphorus and sulfonic acid are used on equal mole basis, while if the thiol is desired, six moles of phosphorus are used for each five moles of the sulfonic acid. It is generally preferred to carry the reaction through to the thiol and then reoxidize the thiol to the disulfide since a purer product is made in this way.

To conduct the reaction, it is only necessary to add the desired quantity of the sulfonic acid to a small amount of iodine as a catalyst, and heat the same in an agitated flask to a temperature of about 80° C. If the sulfonic acid contains any moisture, this can be removed by the addition of phosphorus trichloride or other dehydrating agent. The phosphorus is then added slowly over a period of time while mixing is continued. Either white or red phosphorus may be used. The reaction is exothermic and some means should be provided to prevent the temperature from soaring to an unreasonable value. The reaction ordinarily requires from a few minutes to one or two hours to go to completion, depending upon how high the temperature is allowed to rise. If desired, the reaction can be conducted in two stages when making the thiol. When red phosphorus is used, all of it can be added to the molten mix before the addition of the water. Reaction occurs only to the disulfide stage, however, the remainder of the phosphorus reacting on the addition of water. When white phosphorus is used, most of the phosphorus required by reaction (2) in column 2 will react, but in the absence of water it reacts with the phosphate radical reducing it to lower valence states which will then reduce the disulfide when water is added. It is preferable to operate on the split addition technique because heat removal from the molten reaction mix is difficult whereas in the mix after addition of water it is readily removed by boiling the water. Phosphorus is first added only in a quantity sufficient to form the disulfide, water is then added to the reaction mass and the balance of the phosphorus then added. On the other hand, when red phosphorus is used the phosphorus can all be added during a single stage without the intermediate addition of water. After the reaction is complete, water is added to the reaction mixture and the desired thiol is then obtained, either by solvent extraction, or by steam distillation.

The following non-limiting examples illustrate preferred methods of carrying out the present invention:

Example 1.—About 200 grams crude MCBS (para-chlorobenzene sulfonic acid) and 4 grams iodine were placed in an agitated flask set in a water bath held at 80° C. Five cc. of PCl$_3$ was added to remove any water absorbed by the MCBS in handling. A total of 40 grams of red phosphorus was then added over a 20-minute period. A slow reaction occurred and the mixture thickened considerably. At the end of an hour, the temperature of the reaction mass was 95° C. and then went rapidly to 220° C. After cooling somewhat, 50 cc. of water was added and the solution stirred at the boiling point for three hours. The mixture was then steam distilled, yielding 142 gram p-chlorothiophenol, a 94.5% yield based on total crude acid. (The crude acid normally is 95–97% MCBS.)

Example 2.—About 320 grams crude MCBS, 12 grams of iodine and ½ cc. of PCl$_3$ were placed in an agitated flask equipped with a thermometer and a dropping funnel for the addition of phosphorus. Molten white phosphorus was then added gradually, keeping the solution in the temperature range of 80–100° C. The quantity of phosphorus used was that required by the following equation:

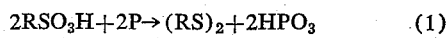

$$2RSO_3H + 2P \rightarrow (RS)_2 + 2HPO_3 \qquad (1)$$

When the reaction was complete, water was added to bring the boiling point of the solution to 155° C. Molten white phosphorus was again added in the quantity required by the equation:

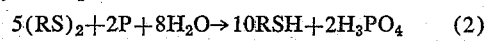

$$5(RS)_2 + 2P + 8H_2O \rightarrow 10RSH + 2H_3PO_4 \qquad (2)$$

The mixture now consisted of two phases, phosphoric acid and p-chlorothiophenol. On steam distillation, 233 grams of p-chlorothiophenol was obtained (97% of theory).

Example 3.—About 169 grams MCBS and 6.4 grams iodine were reacted as in Example 2 with 27.3 grams molten white phosphorus. With the surrounding water bath at 100° C., MCBS and white phosphorus were then added in small increments, keeping the reacting mass at 110–115° C. and removing the heat of reaction by boiling the water in the surrounding bath. This was continued until a total of 438 grams of MCBS and 71.6 grams of white phosphorus had been added, i.e., 1.3% excess of that required by Equation 1. Water was again added to a boiling point of 155° C. and white phosphorus as required by Equation 2 added. Steam distillation yielded 313 grams of p-chlorothiophenol (95.2% of theory). This example illustrates a continuous process.

Example 4.—About 157.5 grams of benzene sulfonic acid (crude), 4 cc. PCl$_3$ and 6.3 grams iodine were reacted in a manner similar to Example 2 with 32.5 grams of white phosphorus. Water was then added to a boiling point of 155° C. and additional phosphorus as required by Equation 2 added. Steam distillation yielded 74.5 grams of thiophenol (68% of theory).

Example 5.—About 130 grams of crude 2, 4, 5-trichlorobenzene sulfonic acid (approximately 90–95%), 2 cc. PCl$_3$ and 5.2 grams iodine were heated to 80° C. Red phosphorus was then added slowly. The first 4 grams reacted violently (due to reduction of H$_2$SO$_4$ and HSO$_3$Cl present in the crude acid). The remainder (14.6 grams) reacted smoothly but slowly. The mix was then heated to 150° C. to complete the reaction. Water was then added to a boiling point of 160–165° C. and the solution agitated and refluxed to finish the reduction of the thiol. On cooling, the crude thiol solidified and was filtered from the phosphoric acid and thoroughly washed. It was then dissolved in caustic and filtered from the excess red phosphorus. The thiol was then reprecipitated with acid, filtered, washed and dried to yield 83 grams of thiol (83% of theory).

*Example 6.*—About 138.1 grams MCBS and 5.5 grams iodine placed in a well-agitated flask. White phosphorus was added slowly keeping the temperature of the reaction mix between 80–100° C. When 24 grams of white phosphorus had been added, the solution was too thick to allow further addition. Water was then added as in previous examples and the remainder of the phosphorus as required by reactions (1) and (2) was added. The thiol was recovered by steam distillation and equalled 96.1 grams which was about 93 percent of theory.

*Example 7.*—About 113 grams of 2 naphthalene sulfonic acid monohydrate were heated to 130° C. and the water of crystallization removed by pumping to 25 mms. On cooling to 95° C., 1 cc. of $PCl_3$ was added to remove the last of the water. Four grams of iodine were added as a catalyst and one mol of red phosphorus added in small portions. A water bath and good agitation were used to hold the temperature between 92–105° C. When all the phosphorus had been added, about 15 cc. of water were added and the reduction finished with 3+ grams of white phosphorus. The thiol was recovered by extraction with benzene. Evaporation of the benzene yielded 80 grams crude thiol assaying about 95%.

*Example 8.*—Crude toluene sulfonic acids (para, ortho and meta) 1 mol were reduced in the same manner. The temperature in this case was held at 60–75° C. The mixed thiols (para, ortho and meta) were steam distilled for purification; 97.5 grams of product were gotten, representing a yield of 77.5% based on the weight of the acid and toluene used to prepare the crude sulfonic acids.

I claim:

1. The process of making disulfides and thiophenols from aromatic sulfonic acids comprising heating together an aromatic sulfonic acid, iodine catalyst and elemental phosphorus, allowing said mixture to react, and recovering a member selected from the group of thiophenols and disulfides from said reaction mixture.

2. The process of claim 1 wherein about 6 moles of phosphorus are used for each mole of the sulfonic acid.

3. The process of claim 1 wherein the reaction is conducted at a temperature of about 80° C. to about 225° C.

4. The process of making a thiophenol from an aromatic sulfonic acid comprising heating together about 10 moles of an anhydrous aromatic sulfonic acid with about 10 moles of phosphorus, permitting the reaction to go substantially to completion, adding about 2 moles of phosphorus and about 8 moles of water to the reaction mixture, permitting the reaction to again go to completion and recovering a thiol from the reaction mixture.

5. The process of making p-chlorothiophenol comprising reacting anhydrous parachlorobenzene sulfonic acid with phosphorus in the presence of iodine, adding water to the mixture and recovering p-chlorothiophenol from the reaction mixture.

6. The process of making thiopenol comprising reacting anhydrous benzene sulfonic acid with phosphorus in the presence of iodine, adding water to the mixture and recovering thiophenol from the reaction mixture.

7. The process of making 2,4,5-trichlorothiophenol comprising reacting anhydrous 2,4,5-trichlorobenzene sulfonic acid with phosphorus in the presence of iodine, adding water to the mixture and recovering 2,4,5-trichlorothiophenol from the reaction mixture.

8. The process of making methylthiophenol comprising reacting anhydrous toluene sulfonic acid with phosphorus in the presence of iodine, adding water to the mixture and recovering methylthiophenol from the reaction mixture.

9. The process of making 2-thionaphthol comprising reacting anhydrous 2-naphthalene sulfonic acid with phosphorus in the presence of iodine, adding water to the mixture and recovering 2-thionaphthol from the reaction mixture.

References Cited in the file of this patent

Miescher et al.: Helv. Chim. Acta 22, 601–610 (1939).

UNITED STATES PATENT OFFICE

CERTIFICATE OF CORRECTION

Patent No. 2,947,788                      August 2, 1960

Harold Pitt

It is hereby certified that error appears in the printed specification of the above numbered patent requiring correction and that the said Letters Patent should read as corrected below.

Column 4, line 2, for "mole" read -- 5 moles --.

Signed and sealed this 4th day of April 1961.

(SEAL)
Attest: ERNEST W. SWIDER

XXXXXXXXX
Attesting Officer

ARTHUR W. CROCKER
Acting Commissioner of Patents